UNITED STATES PATENT OFFICE.

ALLAN TWISTLETON HALL, OF 1 GROSVENOR TERRACE, BEVERLEY ROAD, HULL, ENGLAND.

REFINING VEGETABLE OILS.

SPECIFICATION forming part of Letters Patent No. 347,345, dated August 17, 1886.

Application filed June 1, 1886. Serial No. 203,845. (No specimens.)

*To all whom it may concern:*

Be it known that I, ALLAN TWISTLETON HALL, a subject of the Queen of Great Britain, residing at 1 Grosvenor Terrace, Beverley Road, Hull, England, gentleman, have invented certain new and useful Improvements in Refining Vegetable Oils, of which the following is a specification.

My invention is especially applicable to refining the crude oil of rape-seed, and also crude linseed-oil. For this purpose I take the crude oil and mix it with about an equal quantity of hydrocarbon spirit. I employ, by preference, benzoline or petroleum spirit, but bisulphate of carbon may be used. To the solution of oil in spirit which I thus obtain I add, in the case of rape-oil, from one-half to five per cent., or more, of sulphuric acid. I vary the amount of acid according to the greater or less amount of impurity which the oil contains. For rape-oil I use a strong acid of a specific gravity of, say, 1.840. I introduce the acid into the oil solution while the latter is contained in a closed vessel. I run in the acid through a perforated pipe, so that the acid may pass into the oil in numerous fine thread-like streams. During the introduction of the acid I thoroughly agitate the contents of the vessel. Afterward I allow the mixture to stand for some time, and a mud-like material subsides to the bottom of the vessel. The color of this mud will vary from green to black, according to the amount of acid which has been used. If the mud be quite black, it indicates that the quantity of acid employed has been larger than is necessary. I draw the liquid off from the mud, and, by preference, I thoroughly agitate the oil solution with water in order to free it from any remaining acid. Then, by preference, I pass it through a filtering-bed of animal charcoal—say about two feet thick. The oil solution will be found to pass from the filter considerably lighter in color than it enters it. I now introduce the solution into another closed vessel. Here it is heated by blowing free steam through it. The heat evaporates the solvent, which passes into a condenser, where it is condensed and is so recovered in a state to be again used. The refined oil remains behind, and in a state of greater purity than if it had been refined by the processes hitherto employed.

When linseed-oil is treated, I proceed in a similar manner and employ about the same amount of acid; but the acid should not be so strong as when treating rape-oil. A specific gravity of 1.750 will be found suitable.

In some cases the rape-oil or linseed-oil is separated from the seed by means of a solvent, in lieu of by pressure, and in such cases I proceed to separate the excess of solvent and to treat the solution by means of sulphuric acid, as already described.

Having now particularly described and ascertained the nature of my said invention and in what manner the same is to be performed, I declare that what I claim is—

Refining vegetable oils by treating the same with sulphuric acid while held in solution in hydrocarbon spirit or other solvent, substantially as described.

ALLAN TWISTLETON HALL.

Witnesses:
ALFRED ARNOLD KINGDON,
*Notary Public, Kingston-upon-Hull.*
ROBERT GAMESON,
*His Clerk.*